United States Patent
Moffa et al.

(10) Patent No.: US 6,846,044 B2
(45) Date of Patent: Jan. 25, 2005

(54) STOWABLE SEAT WITH REDUCED VIBRATION AND IMPROVED LOCKING MECHANISMS

(75) Inventors: Michael D. Moffa, Glen View, IL (US); Karim Mikhail, Highland, IN (US); Anthony Purnell, Chicago, IL (US)

(73) Assignee: Freedman Seating Company, Chicago, IL (US)

( * ) Notice: Subject to any disclaimer, the term of this patent is extended or adjusted under 35 U.S.C. 154(b) by 21 days.

(21) Appl. No.: 10/402,657

(22) Filed: Mar. 28, 2003

(65) Prior Publication Data

US 2004/0189077 A1 Sep. 30, 2004

(51) Int. Cl.[7] ................................................. A47C 5/02
(52) U.S. Cl. .................... 297/452.39; 297/169; 297/14; 297/378.14
(58) Field of Search ................................ 248/293, 286; 297/331, 332, 334, 335, 235, 248, 14, 1, 2, 105, 169, 452.39; 296/65.09, 65.11

(56) References Cited

U.S. PATENT DOCUMENTS

| | | | | |
|---|---|---|---|---|
| 2,565,666 A | * | 8/1951 | Schaefer | 180/318 |
| 4,103,934 A | * | 8/1978 | Arnholt et al. | 280/807 |
| 4,354,791 A | * | 10/1982 | Antonellis | 414/343 |
| 4,913,487 A | * | 4/1990 | Breckel et al. | 297/14 |
| 4,955,973 A | * | 9/1990 | Provencher | 296/65.07 |
| 5,335,963 A | * | 8/1994 | Muller et al. | 297/244 |
| 5,489,141 A | | 2/1996 | Strausbaugh et al. | |
| 5,492,389 A | * | 2/1996 | McClintock et al. | 297/14 |
| 5,547,205 A | * | 8/1996 | do Rosario Sousa de Cabedo | 280/30 |
| 5,588,700 A | * | 12/1996 | Homier | 297/238 |
| 5,951,104 A | * | 9/1999 | Tsuchiya et al. | 297/316 |
| 6,554,357 B2 | * | 4/2003 | Moffa | 297/253 |

* cited by examiner

Primary Examiner—Peter M. Cuomo
Assistant Examiner—Erika Garrett

(57) ABSTRACT

A stowable fold away seat for mounting to a support member of a vehicle wherein a space may be selectively provided for positioning a wheelchair or article adjacent to the stowed seat which includes a frame attached to the support member, two separate seatbacks and seatbases, which have been fixedly integrated with a centered support.

14 Claims, 5 Drawing Sheets

STOWABLE SEAT WITH REDUCED VIBRATION AND IMPROVED LOCKING MECHANISMS

BACKGROUND OF THE INVENTION

This invention relates generally to an improved stowable fold away seat in a vehicle in order to provide a space for a wheelchair or for storage of various articles. The invention employs cantilevered fixedly integrated seatbases which pivot on one end from a horizontally deployed position to a vertically stowed position and from a vertically stowed position to a horizontally deployed position. Further, the seatbases are provided with two integrated seatbacks that have a lockable unfolded position, substantially perpendicular to the range of motion for the seatbases, as well as a lockable folded position substantially flat against the seatbases.

The fold away seat is stowed by folding the seatbacks substantially flat against the seatbases. After folding the seatback substantially flat against the seatbases, the seatbases are unlocked from the horizontally deployed position, raised to the vertically stowed position, and locked in place. The wheelchair or other article may be placed in the space vacated by the stowed seat.

At present, the Straughsbaugh Patent, U.S. Pat. No. 5,489,141 owned by the C.E. White Co., is known to enable a seatbase which has a support leg extending from the aisle end of the seatbase, and the McClintock Patent, U.S. Pat. No, 5,492,389, which is owned by the applicant, enables a cantilevered, integrated, upholstered seatbase with a one-piece, single seatback. In the Straughsbaugh seatbase, typically the aisle leg is fastened to the floor when the seat is down, or tucked away when the seat is stowed away. While the known fold away seats as shown by Straughsbaugh have a support leg that can be folded up to provide space for a user or for storage, this did not disclose, teach, or suggest any cantilevered seatbases which avoids the attendant difficulties arising from the use of the aisle leg on the seatbases which at times interferes with an operator and requires additional steps for stowing. Nor did the Straughsbaugh patent disclose, teach, or suggest any cantilevered seatbases with separate seating surfaces and integrated seatbacks utilizing a centered support and bearing to allow the seat to utilize individual seat shells, reduce the bulk, weight, and amount of material required which avoids the attendant difficulties such as increased vibration arising when deployed and used for vehicles, including mass-transit vehicles.

While the McClintock Patent, U.S. Pat. No, 5,492,389, which is owned by the Applicant, the fold away seat has a cantilevered, uniformly upholstered seatbase with a one-piece, single seatback that can be folded away to provide space for storage, these seats did not disclose, teach, or suggest any cantilevered seatbases with separate seating surfaces and seatbacks utilizing a centered support and bearing to allow the seat to incorporate individual seat shells, reduce the bulk, weight, and amount of material required which avoids the attendant difficulties such as increased vibration arising when used for vehicles, including mass-transit vehicles. Previous fold away seats, whether cantilevered or utilizing an aisle leg, featured materials and designs which were inappropriate for the purposes of reducing bulk, weight, and amount of material required thereby preventing the seats from vibrating when deployed in vehicles.

Currently, especially when used in mass transit vehicles, it is necessary for fold away seats to be lighter yet more stable and provide adequately firm seats with reduced vibration. Without the center support and bearing the seatbacks would be forced to have additional depth and material added to it. The center support and bearing enables the bridging of a smaller span. This reduction in span width enables the seatback to have increased rigidity reduced vibrations without the penalty of additional material of back depth thickness.

SUMMARY AND OBJECTS OF THE INVENTION

Accordingly, it is an object of the present invention to provide a stowable seat for mounting to a support member of a vehicle wherein a space may be selectively provided for positioning a wheelchair or articles adjacent to the stowed seat which includes a frame, wall mount, or floor mount, seatbases, and seatbacks. The seatbacks and seatbases are separated and fixedly integrated with a centered support bearing or other device to increase rigidity and reduce bulk, weight, materials used, and vibrations inherent in lightweight stowable seats. Furthermore, the invention includes improved separate locking mechanisms, comprised of a "down lock" and an "up lock", which hold the seat in either its horizontally deployed or vertically stowed positions and are releasable to enable movement to either the vertically stowed or horizontally deployed positions.

Consequently, the frame attaches to the support member of a vehicle and the cantilevered seatbases have a free end and a pivotable end rotatably associated with the frame which provides the seatbases with a range of motion extending from a horizontally deployed position to a vertically stowed position. The integrated seatbases also have separate lock mechanisms, one near the free end to maintain the seatbases in the deployed position, and one near the center of the seatbases to maintain the seatbase in the stowed position. These mechanisms use unique opposite acting screws to capture and secure the movement of the cross bar which moves when the seatbases are raised from the deployed position to the stowed position and vice versa. The lock mechanisms, which secure the seatbases in the stowed or deployed positions, work in a manner similar to one another in that the locks enable the adjusting screw in the receiving chamber of the lock to compensate for any production tolerances or wear that may occur. The ability to remove unwanted space from the receiving chamber of the lock enables the user to cancel out the propensity of the lock and bar to rattle against each other while the vehicle is in motion. The rattle/vibration-induced noise is a major complaint against many fold away seats.

The integrated seatbacks, which are rotatably associated with the seatbases, have a range of motion extending from an unfolded position to a folded position. In the unfolded position, the range of motion of the seatbacks is substantially perpendicular to the range of motion of the seatbases. In the folded position, the seatbacks are adapted to fold substantially adjacent to the integrated seatbases for stowing to provide the space for a wheelchair or other object.

The seatbacks are able to fold forward because of support and bearings at each end and in the center of the seatbacks. The center support and bearing enables the use of individual seat shells, and without the center support bearing, the seatbacks would be forced to have additional depth and material added to them by way of a single, larger seat shell. The center support and bearing enable bridging a smaller span. This reduction in span width enables the seatbacks to have increased rigidity and reduced vibration without the penalty of additional material of back depth thickness.

BRIEF DESCRIPTION OF THE DRAWINGS

In order to satisfy the objects of the invention discussed herein, a stowable seat for mounting in a vehicle is provided as illustrated by the accompanying drawings wherein.

DESCRIPTION OF THE PREFERRED EMBODIMENTS

Figure 1:
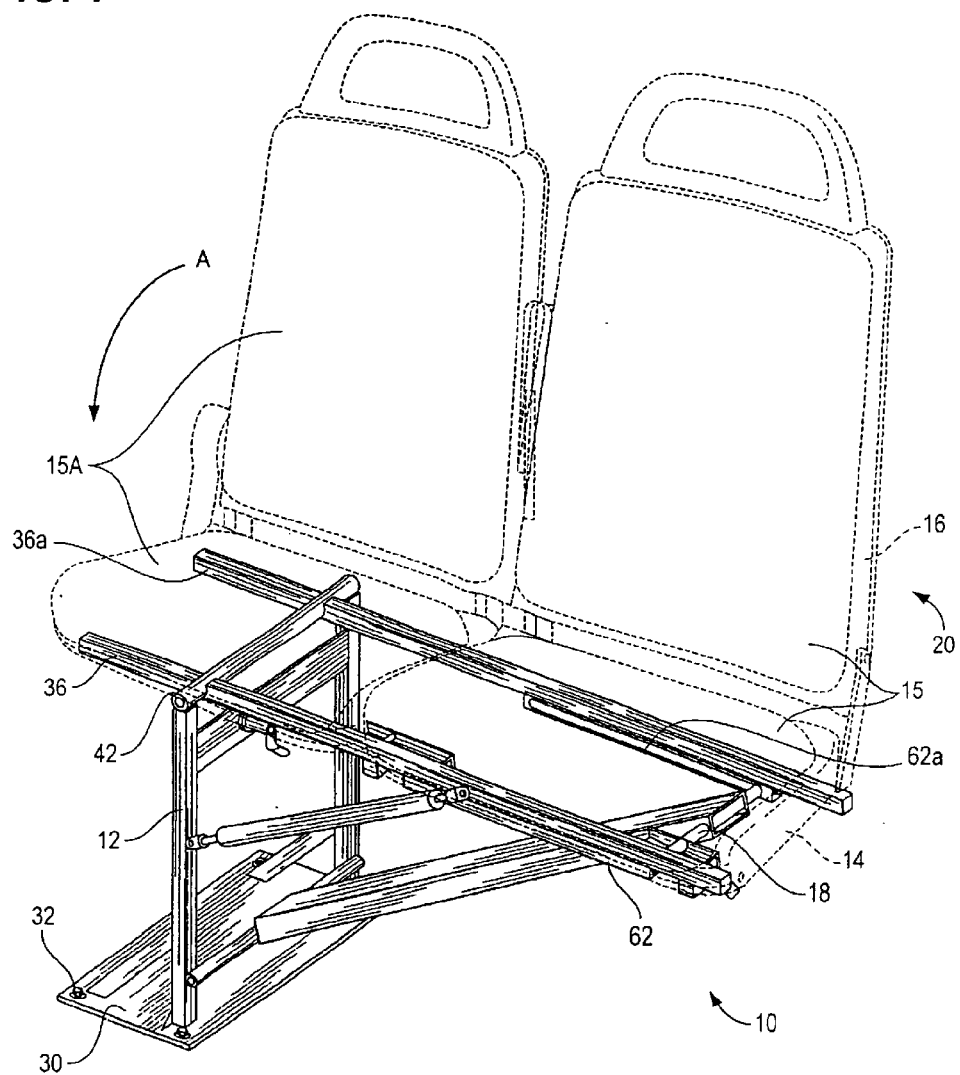
FIG. 1 is a isometric view of the stowable seat illustrating the seatbase in a horizontally deployed position and the seatback in an unfolded vertical position in phantom outline where the illustration shows the frane, the tracks upon which the T-bar moves, and the "up" and "down" locking mechanisms.
Figure 2:
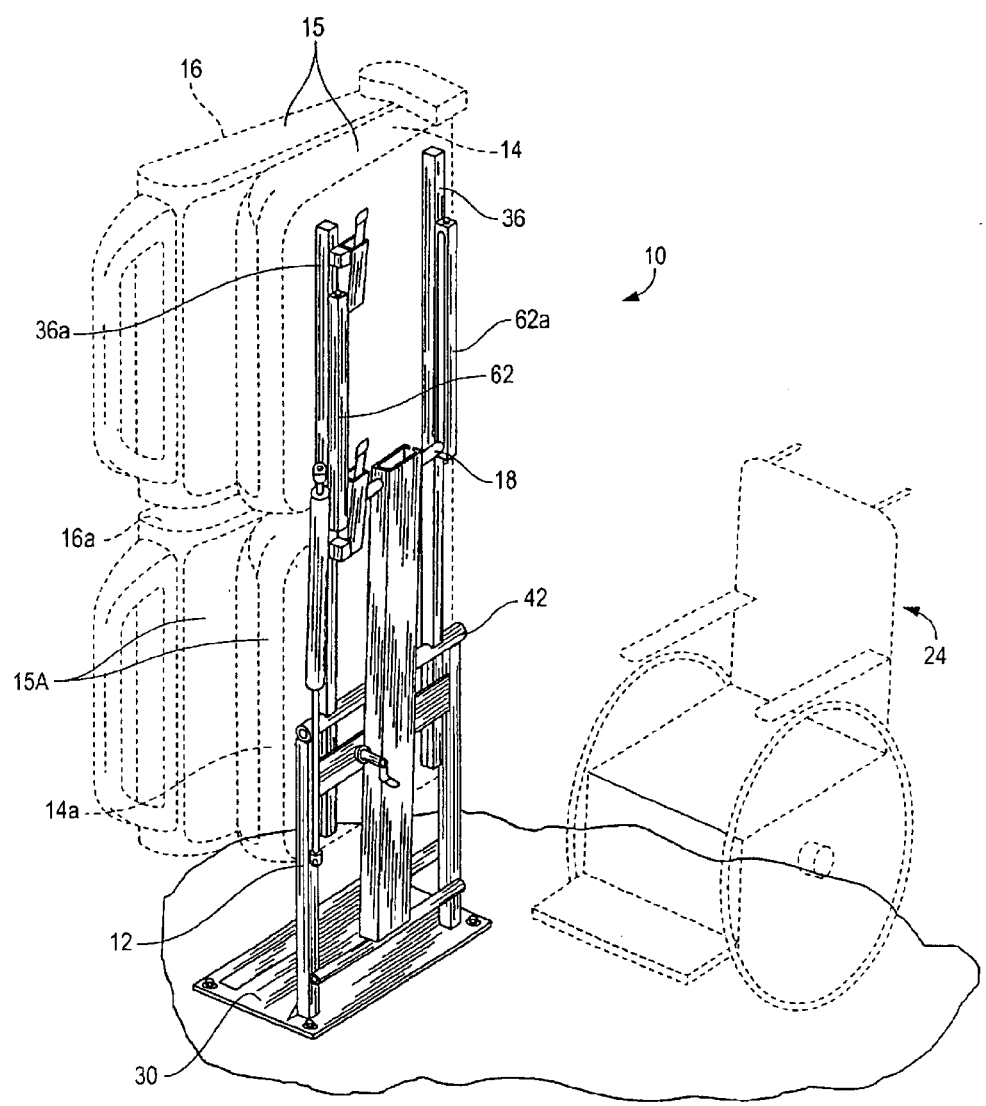
FIG. 2 is a pictorial view of the stowable seat illustrating the seatback in a folded position and the seatbase in a vertically stowed position where a wheel chair is illustrated in phantom outline in the space vacated by the stowable seat.

Referring to FIGS. 1 and 2, the stowable seat of the invention is generally designated by the reference numeral 10. The stowable seat generally includes a frame 12, seatbases 14 and 14a, seatbacks 16 and 16a, and a moving T-bar 18.

Figure 2A:
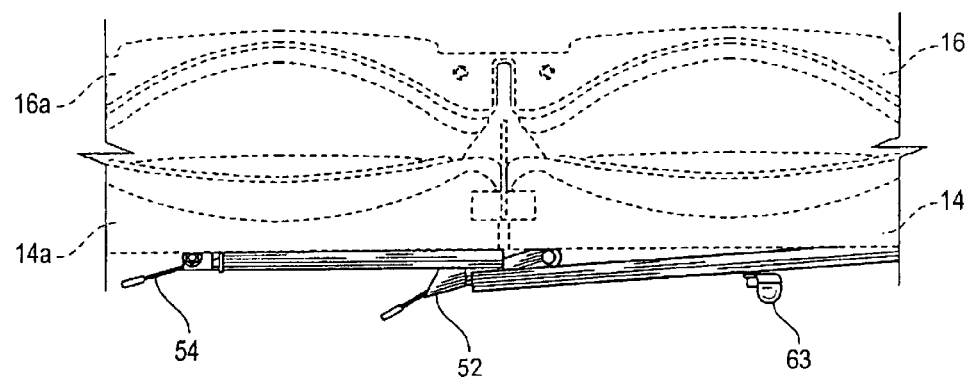
FIG. 2A is a rear view of the stowable seat illustrating the center strut and center bearing in phantom lines when the seatbacks and seatbases are adjacent to each other prior to moving to either the stowed or deployed position.

Briefly, in operation, the stowable seat 10 is typically utilized with the seatbases 14 in a horizontal deployed position 20 and the seatbacks 16 in a vertical stowed position. The seatbacks 16 and 16a have a range of motion as indicated by the arrow A perpendicular to a range of motion of seatbases 14 and 14a as shown in FIG. 2. The seatbases 14 and 14a are supported by the movable T-bar 18. To provide space for a wheelchair 24 or other such article, the seatbacks 16 and 16a are folded over to their folded position closely adjacent to the seatbases 14 and 14a and the seatbases 14 and 14a as shown in FIG. 2A. Thereafter the seatbases 14 and 14a are raised to the vertically stowed position 28 as FIG. 2 illustrates.

When the seat 10 is in its deployed position and one desires to put it in its stowed position, the deployed locking mechanism 54 is pressed and the seat 10 can be raised to the stowed position. When the deployed locking mechanism 54 is pressed the movable T-bar 18 begins to slide along the channels 62 and 62a into the stowed locking mechanism 52. Once the movable T-bar 18 has made contact with the stowed locking mechanism 52, the stowed locking mechanism 52 is opened so that the movable T-bar 18 slides into place in the stowed receiving chamber 44 and held firmly into place by the adjustable screw 46. The adjustable screw 46 allows for adjustments to be made so as to hold the seat 10 firmly into place with minimal vibration. Once in the stowed position, the seat 10 can be further secured by a safety lock 63 rotated to a perpendicular position across the movable T-bar 18.

Figure 3:
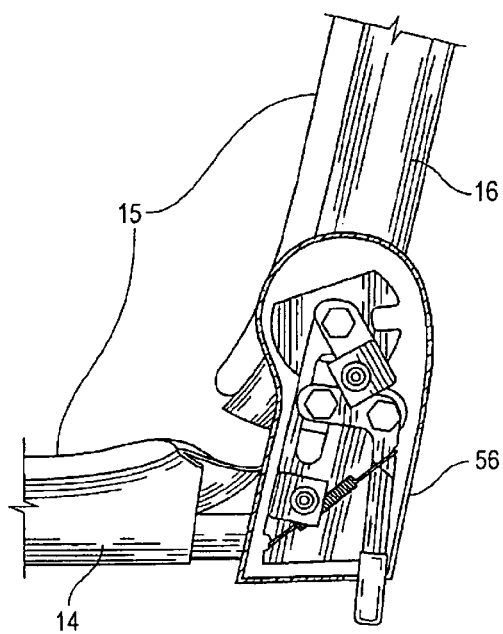
FIG. 3 is a side elevational view of the seat in its deployed position illustrating an enlarged side elevation view of the dump mechanism that locks the seatbacks in the vertical and horizontal positions for the purposes of the stowable seat being stowed or deployed, where the cover of the dump mechanism has been removed.
Figure 4:
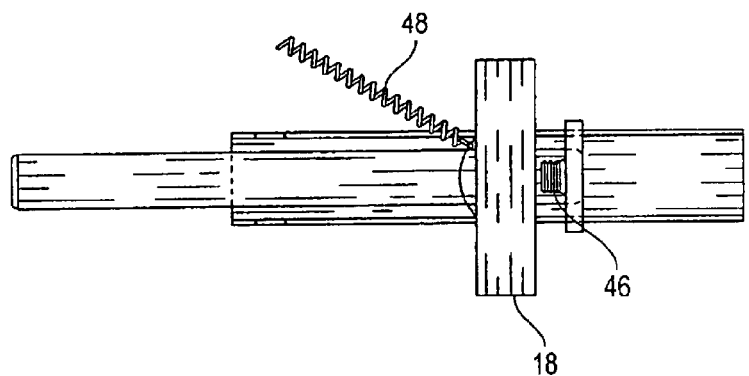
FIG. 4 is a view showing how both the deployed locking mechanism 54 and stowed locking mechanism 52, including the spring 48, which holds the movable T-bar 18 in place when the seat is locked in either the deployed position or stowed position in the receiving chamber 44 or 45, where the movable T-bar 18 and the screw 46 are illustrated.
Figure 4A:
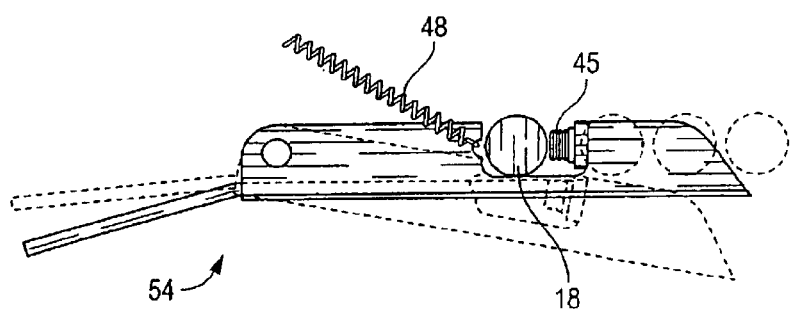
FIG. 4A is a side view of the deployed locking mechanism which shows the T-bar locked into place within the receiving chamber and securely held by the screw, where the motion of the movable T-bar and the locking mechanism are shown in phantom outline.
Figure 4B:
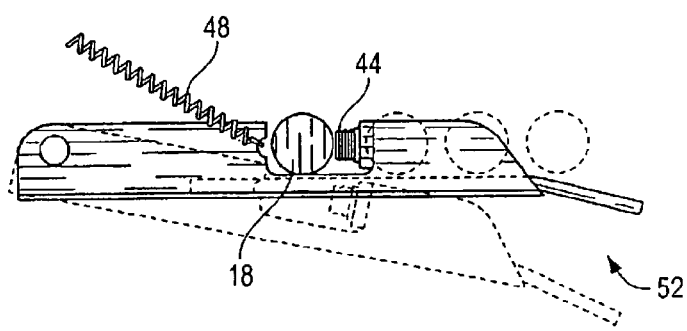
FIG. 4B is a side view of the stowed locking mechanism, which shows the T-bar locked into place within the receiving chamber and securely held by the screw, where the motion of the movable T-bar and the locking mechanism are shown in phantom outline.

To move the seat 10 from its stowed position to its deployed position, the safety lock 63 must be rotably removed from across the movable T-bar 18. The stowed locking mechanism 52 must be pulled downward so as to release the movable T-bar 18 to allow it to move along the channels 62 and 62a. The movable T-bar 18 will slide along the channels 62 and 62a until it is brought into contact with the deployed locking mechanism 54. Once the movable T-bar 18 has made contact with the deployed locking mechanism 54, the deployed locking mechanism 54 is opened so that the movable T-bar 18 slides into place in the deployed receiving chamber 45 and held firmly into place by the adjustable screw 46. The adjustable screw 46 allows for adjustments to be made so as to hold the seat 10 firmly into place with minimal vibration. Further, when in the deployed position, the dump mechanism 56 locks the seatbacks 16 and 16a in the vertical position as illustrated in FIG. 3.

The frame 12 is provided as illustrated in FIG. 1 to mount the stowable seat 10 to a support member 20 that can rest on the floor (not shown) of a vehicle as shown in FIG. 1. To mount the stowable seat 10 to a support member (not illustrated) such as the floor of a vehicle, the frame 12 is provided as illustrated in FIG. 1.

As seen in FIGS. 1 and 2, the frame 12 includes a plate 30 preferably constructed of steel. Plate 30 is provided with bolt holes 32 for bolting to the floor of another support member (not illustrated). The plate 30 is offset from the center of the seatbases 14 and 14a as illustrated in FIG. 1 to provide space for the passengers' feet. The seatbases 14 and 14a are shown as generally rectangular, and having inner support frames 36 and 36a as seen in as FIGS. 1 and 2.

To provide the seatbases 14 with a range of motion from a horizontal deployed position 20 to the vertically stowed position 28 as FIGS. 1 and 2 illustrate, the inner seat frame 36 is rotatively associated with the frame 12 by an axis 42 as FIGS. 1 and 2 illustrate.

Figure 5:
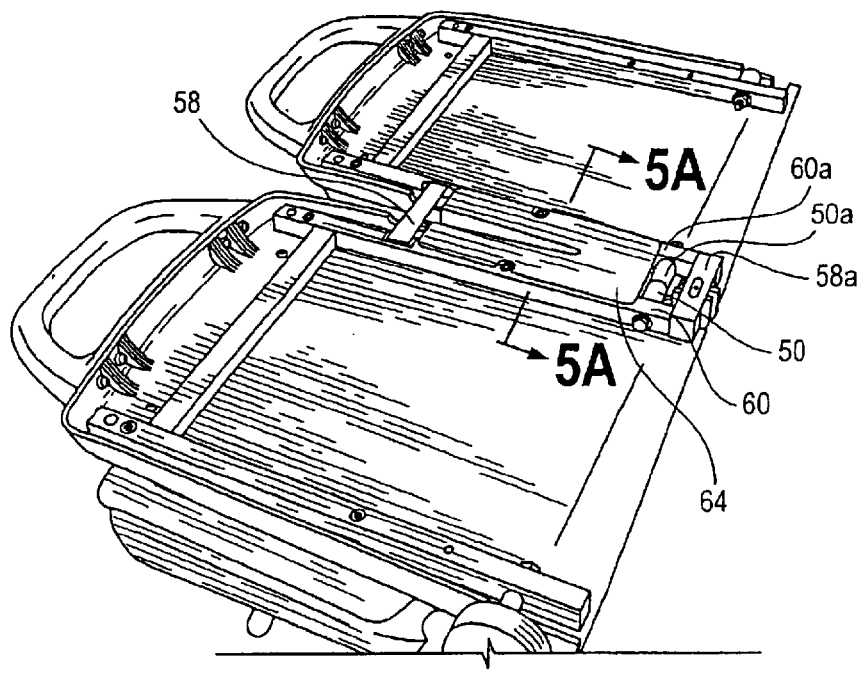
FIG. 5 is an isometric view of the seatbacks with hard plastic cover which acts as a spacer between the seatbacks where the center strut through which the center bearing is run.
Figure 5A:
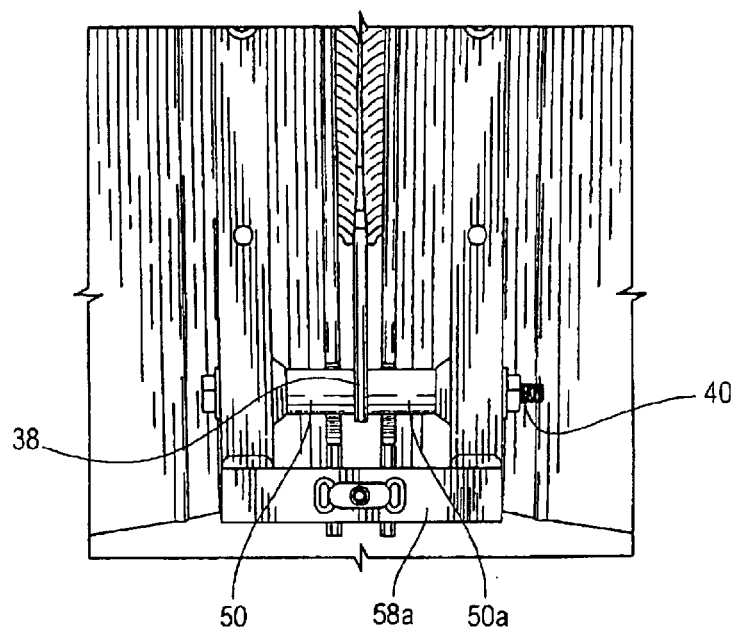
FIG. 5A is a top section taken on a plane pressing through the line A—A and looking in the direction of the arrows, specifically illustrating the lower interior portions of the seatbacks joined by the lower welded band, specifically illustrating the center strut, the center bearing, and the sleeves through which the center bearing runs, showing the sleeves adjacent to both sides of the center strut to eliminate vibration.

The center strut 38 as illustrated in FIG. 5A supports the seatbacks 16 and 16a in the folded and unfolded positions. A center bearing 40, which is adjustable, runs through the center strut 38 allowing the seat to rotate between the folded and unfolded positions. Encasing the center bearing 40 are sleeves 50 and 50a as illustrated in FIG. 5 and 5A. Each sleeve 50 and 50a attaches to the seatback frames 60 and 60a on one end with the opposite end coming into close proximity with either side of the center strut 38. The seatback frames 60 and 60a are connected by welded metal bands 58 and 58a as illustrated in FIG. 5.

The above has been offered for illustrative purposes only and is not intended to limit the scope of the invention of this application, which is defined in the claims below.

What is claimed is:

1. A stowable seat rotatably movable through a range of positions between a stowed position and a deployed position, whereby an article such as a wheel chair can be stored adjacent to said stowable seat when in the stowed position, and when in said deployed position one or more seatbase members of said stowable seat provide an area for seating; comprising:

an axis and a frame pivotally mounted whereby said frame is rotatably moveable on said axis between said stowed and said deployed positions;

at least two seatbase members being associated together and mounted on said frame for the purpose of simultaneously rotating said seatbase members on said axis from said stowed position to said deployed position;

at least two seatbacks associated together for purposes of rotatably associating with said seatbase members, enabling said seatbacks to be moved from a substantially parallel folded position to a substantially perpendicular unfolded position by way of rotation for the purpose of being in said deployed position, further, said seatbacks can be rotated toward said seatbase members from a substantially perpendicular unfolded position to a substantially parallel folded position, wherein said seatbacks and said seatbase members can be rotated concurrently to said stowed position thereafter;

said seatbacks are rotatably associated with said seatbase members of said stowable seat, by a center strut, a bearing and a pair of sleeves disposed on each side of said center strut, and having said bearing passing through a portion of said center strut and said seat backs to dampen the vibration of said stowable seat.

2. The stowable seat as defined in claim 1, wherein a movable T-bar pivotally associated to the base of said frame for the purpose of rotating and sliding said movable T-bar and guiding the stowable seat between the said stowed and said deployed positions, and said movable T-bar having the purpose of supporting said stowable seat when in said stowed and deployed positions by being releasably locked in each position.

3. The stowable seat as defined in claim 1, wherein said seatbacks are associated to each other to rotate simultaneously and fixedly connected.

4. The stowable seat as defined in claim 1 wherein said seatbacks are rotatably associated to said seatbase members by way of two independent axises located at each end of said stowable seat and a center strut and axis through which runs a center bearing that is adjustable.

5. The stowable seat as defined in claim 1 wherein said seatbacks further comprise a dump mechanism for selectively and releasably locking said seatbacks in said folded position and being movable to said unfolded position or from said unfolded position to said folded position in either said stowed or said deployed position.

6. The stowable seat as defined in claim 1, wherein said seatbacks are centrally supported by a said center strut which aids in rotatably associating said seatbacks to said seatbase members between the folded and unfolded positions by way of said center bearing which passes through said center strut.

7. The stowable seat as defined in claim 1, wherein said seatbase members further comprise said movable T-bar associated with releasable locking means which can selectively secure said stowable seat in either said stowed or said deployed positions.

8. The stowable seat as defined in claim 7, wherein channels are provided and said movable T-bar is slidably and rotatably associated with said channels which are fixedly associated with said seatbase members at the bottom thereof to attain the desired position.

9. The stowable seat as defined in claim 8, wherein said adjustable screws at the ends of said channels nearest the free end of said seatbase members provide a stop for said movable T-bar when said seat is in said deployed position and secured by said deployed locking mechanism.

10. The stowable seat as defined in claim 7, wherein said stowed locking mechanism and said deployed locking mechanism are further comprised of a receiving chamber, and an adjustable screw whereby said movable T-bar is held firmly in desired position when in said receiving chamber and in contact with said adjustable screw within either said stowed locking mechanism or said deployed locking mechanism.

11. The stowable seat as defined in claim 10, wherein said locking mechanisms operate on pivots which enables said locking mechanisms to open and close around said T-bar, whereby said T-bar can be moved between said locking mechanisms, and where said pivots enable said T-bar to be inserted into said receiving chambers.

12. The stowable seat as defined in claim 7, wherein said stowed and said deployed locking mechanisms further comprise receiving chambers into which said T-bar is received and held securely by said adjustable screws.

13. The stowable seat as defined in claim 7, wherein said locking mechanisms face and open in opposite directions.

14. The center strut as defined in claim 1, wherein said bearing passes from one of said seatbacks to the other said seatback, said bearing is enclosed by said sleeves which at one end are attached to said seatbacks and the free ends of said sleeves are closely proximate to either side of said center strut.

\* \* \* \* \*